(12) United States Patent
Maguire

(10) Patent No.: US 6,408,790 B1
(45) Date of Patent: Jun. 25, 2002

(54) ANIMAL LITTER BOX

(76) Inventor: Sara Barbara Maguire, 14075 Alika Dr., Seal Rock, OR (US) 97376

(*) Notice: Subject to any disclaimer, the term of this patent is extended or adjusted under 35 U.S.C. 154(b) by 0 days.

(21) Appl. No.: 09/548,577

(22) Filed: Apr. 13, 2000

(51) Int. Cl.[7] ............................................. A01K 29/00
(52) U.S. Cl. ........................................ 119/166; 119/165
(58) Field of Search ........................ 119/166, 167, 119/165

(56) References Cited

U.S. PATENT DOCUMENTS

| | | | |
|---|---|---|---|
| 3,937,182 A | * 2/1976 | Kamimura | 119/161 |
| 4,649,578 A | * 3/1987 | Vargo | 119/161 |
| 5,184,574 A | * 2/1993 | Kirk et al. | 119/162 |
| 5,353,743 A | * 10/1994 | Walton | 119/166 |
| 5,367,984 A | 11/1994 | Purnell | |
| 5,394,835 A | * 3/1995 | Gatta | 119/170 |
| 5,515,812 A | 5/1996 | Faust | |
| 5,699,754 A | 12/1997 | Cahajla | |

* cited by examiner

*Primary Examiner*—Charles T. Jordan
*Assistant Examiner*—John W. Zerr
(74) *Attorney, Agent, or Firm*—Chernoff, Vilhauer, McClung & Stenzel, LLP

(57) ABSTRACT

An animal litter box includes a litter tray for retaining a nonabsorbent litter that includes liquid permeable bottom means, preferably the bottom means defining a plurality of openings sized to allow the flow of liquid waste, but not the passage of litter. The litter tray fits into and is supported by a drain pan, the drain pan including an upstanding perimeter wall and a downwardly and inwardly sloping floor that includes a drain hole for the passage of liquid waste that has flowed through the litter tray liquid permeable bottom means. The liquid waste flows into and is collected by a reservoir drawer that is removably positioned within a base so that the liquid is captured by the reservoir drawer as it flows down the drain pan floor and through the drain pan hole. The base includes an upstanding perimeter support wall that has an opening for the placement and removal of the reservoir drawer, and the base supports the drain pan within its perimeter wall. Alternatively, the drain pan and base are formed into a different base by the combination of the drain pan and the first base into an integral single unit, rather than a two piece combination.

9 Claims, 3 Drawing Sheets

ANIMAL LITTER BOX

BACKGROUND OF THE INVENTION

1. Field of Invention

This invention relates generally to animal husbandry, and more particularly to an animal litter box of the type used in the home for the reception of liquid and solid waste matter.

2. Description of Prior Art

What is commonly used for an animal litter box is a receptacle or pan which is filled with particulate, and the particulate is typically a type of absorbent clay matter which absorbs the liquid waste and receives the solid waste matter. A common problem with this type of litter box includes the frequent cleaning of the litter box requiring complete removal of the contents and litter, which is a non-sanitary, odorous and time-consuming task. The frequent cleaning and method of cleaning due to the complete removal and replacement of the litter also requires the use and waste of a lot of litter, which is not economical.

One way that prior art patents have addressed this problem is with a litter pan design that allows the separation of the liquid waste from the solid waste so that the liquid waste is generally confined in a separate receptacle, thereby allowing for less frequent cleaning of the box, in that the saturated clay matter (litter) is no longer filled with the liquid, as the liquid has passed through the matter and into the separate receptacle. There are many problems, however, associated with the designs of the prior art patents.

For example, U.S. Pat. No. 5,184,574 to Kirk et al. discloses a cat litter box which separates the liquid from solid waste with a combination of an upper tray inset into a base pan. The upper tray includes openings for the flow of liquid and is lined with a non-absorbent type of litter, and this upper tray is inset into a base. The base then acts as a reservoir for the liquid that percolates through the openings in the upper tray. This base reservoir is then emptied by carrying the entire upper tray and lower base section to a toilet, whereby a valve connected to the base is turned by a handle, allowing the liquid waste to drain into the toilet. There are many problems with this arrangement. First, the entire unit needs to be carried to a toilet bowl or to another area in order to empty the liquid waste reservoir. This can be a difficult and clumsy arrangement, considering there is also litter in the top portion. Second, there are also potential issues with the use of a valve. The only thing between urine, which is contained in the base, and disaster, is the valve not leaking. This could be an issue as all valves have the potential to leak, especially with continued use, plus the fact that the valve may accidentally be turned while being carried by the person emptying out the liquid waste, or even by an animal as they go to step into the box. Third, in order to clean the actual liquid waste compartment, the litter box must be taken apart. This can create quite a sanitation problem when that top litter tray section is removed for cleaning as the bottom of the litter tray section is soiled, and most individuals, to avoid the placement of the dirty litter tray somewhere in the house, would end up taking the entire assembly outside just to clean the liquid compartment.

U.S. Pat. No. 5,515,812 to Faust discloses a cat litter box with a removable litter screen set on a liquid permeable rack which is then set into a lower waterproofed pan. The litter is then put on top of the rack and when the animal uses it, similar to the cat litter box above, the liquid waste percolates through this liquid permeable portion of the rack down into the pan. This arrangement has similar problems to the prior patent disclosed above. For example, in order to clean the liquid waste compartment, the top rack portion needs to be taken out and placed somewhere, and then the bottom portion would then need to be emptied, such as by carrying it to a toilet bowl. Most likely the only place to possibly clean this would also be outside of the home, similar to the patent above.

U.S. Pat. No. 5,367,984 to Purnell discloses a pet litter box, including a bottom pan for collecting liquid waste and an upper box which closely interfits with the bottom pan so as to contain the odors in the bottom pan, and a litter tray which is supported by the upper box. This litter tray includes an apertured flat sheet which supports a layer of litter. The non-absorbed liquid waste passes down into this bottom pan. The aperture flat sheet provides structural rigidity for supporting the weight of the animal. Again, the primary problem with this device similar to the other devices is that in order to clean the liquid waste compartment, the top upper box needs to be removed and placed somewhere, and then the lower box picked up and carried off for cleaning. This patent also has the issue of stability, as the upper box sits closely and tightly on top of the other box.

U.S. Pat. No. 5,699,754 to Cahajla discloses a litter box which includes a urine collection cavity, and then a litter holding tray which is supported over the urine collection cavity. There also is a disposable element which generally lines the litter holding tray. Both the disposable element and the tray are permeable by liquids so that again liquid waste falls through this litter holding tray and through the disposable element into the lower urine collection cavity. This disposable element again would have to be lifted off before the lower urine collection cavity could be cleaned.

The present invention resolves the problem common to typical litter boxes by also separating out liquid from solid waste, but also addresses the problems inherent in the prior art patents. That is, the present invention allows for a sanitary method of disposing and cleaning the liquid waste collection, while also addressing other issues. With the present invention, there is a reservoir drawer provided for within the base of the device so that it is a simple thing to remove this reservoir drawer and empty it out without having to lift off anything on top of the base and without the need to set the top portions that are lifted off in an area that can be contaminated with the used litter.

OBJECTS AND ADVANTAGES

Accordingly, several objects of the present invention are to provide an animal litter box that:

a. allows for simple collection and disposal of liquid waste;

b. does not require frequent cleaning, and when it does need to be cleaned, provides for a simple and sanitary method of cleaning;

b. is economical to use as compared to the typical litter box as there is less frequent need to remove and replace the "litter";

c. will contain odors;

d. will be found palatable by and will be used by animals, in particular felines;

c. is simple and economical to manufacture.

These and further objects will be apparent from the following description and drawings of the preferred embodiments thereof.

BRIEF SUMMARY OF THE INVENTION

The present invention is directed to an animal litter box that satisfies the needs for a simple and sanitary to clean, economical, low odor, and timesaving device. The animal litter box comprises a litter tray for supporting a quantity of litter and an animal, that includes an upstanding perimeter wall and liquid permeable bottom means. In a preferred embodiment, the litter tray is an integrally molded single unit of plastic material, and the liquid permeable bottom means is simply a plurality of openings in the bottom through which liquid waste is free to pass. The openings are sized to prevent the litter from passing though, while allowing the flow of liquid waste. The litter box further comprises a drain pan, preferably also of integrally molded plastic, with an upstanding perimeter support wall and a floor sloping inwardly and downwardly from the perimeter wall, said floor including a drain hole, whereby the liquid waste is free to pass. The drain pan supports the litter tray within the drain pan perimeter wall at the point where the drain pan perimeter wall meets the drain pan floor, and the drain pan is sized to receive the litter tray snugly within the drain pan perimeter wall. The litter box further comprises a base, also preferably of integrally molded plastic, with an upstanding perimeter wall that supports the drain pan in the same fashion as the drain pan supporting the litter tray, i.e., the drain pan fits within the perimeter wall base and the upstanding support walls are complementary so that the can removably fit together in a way so that odors are prevented from escaping past the inter-engaged portions of the base and the drain pan. Placed within the base is a removable reservoir drawer for the liquid waste that is positioned within the base, so as to receive the liquid waste flowing through the drain pan hole, and the reservoir drawer is removed and re-positioned through a drawer opening in the base perimeter wall. Preferably, the reservoir drawer contains a recessed handle so that a person removing the liquid waste from the device can simply remove the drawer, carry it over to a toilet, and empty out the liquid waste into the toilet.

DETAILED DESCRIPTION OF THE INVENTION

Figure 1:
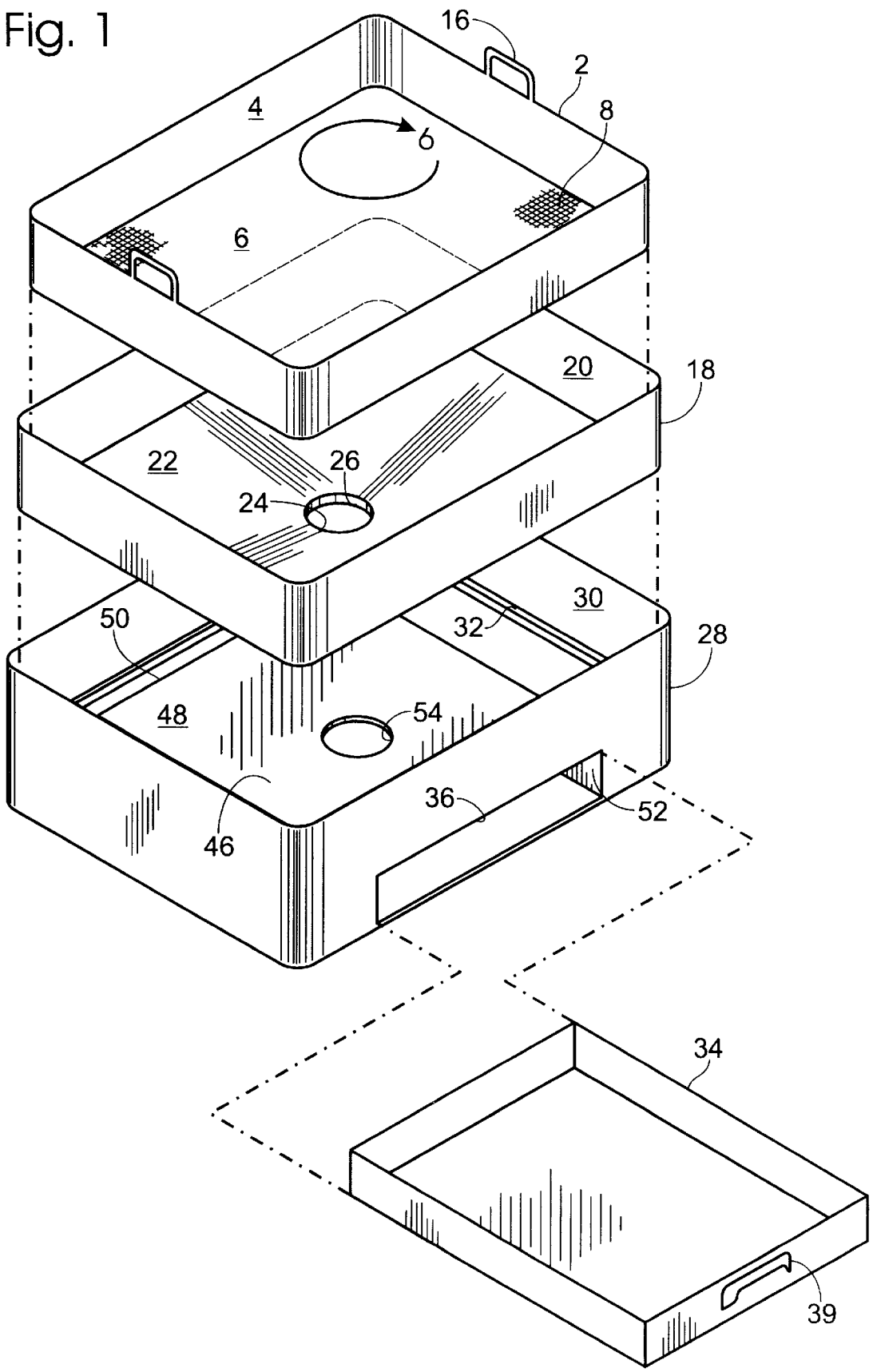
FIG. 1 is an exploded perspective view of the litter box in a preferred embodiment.
Figure 2:
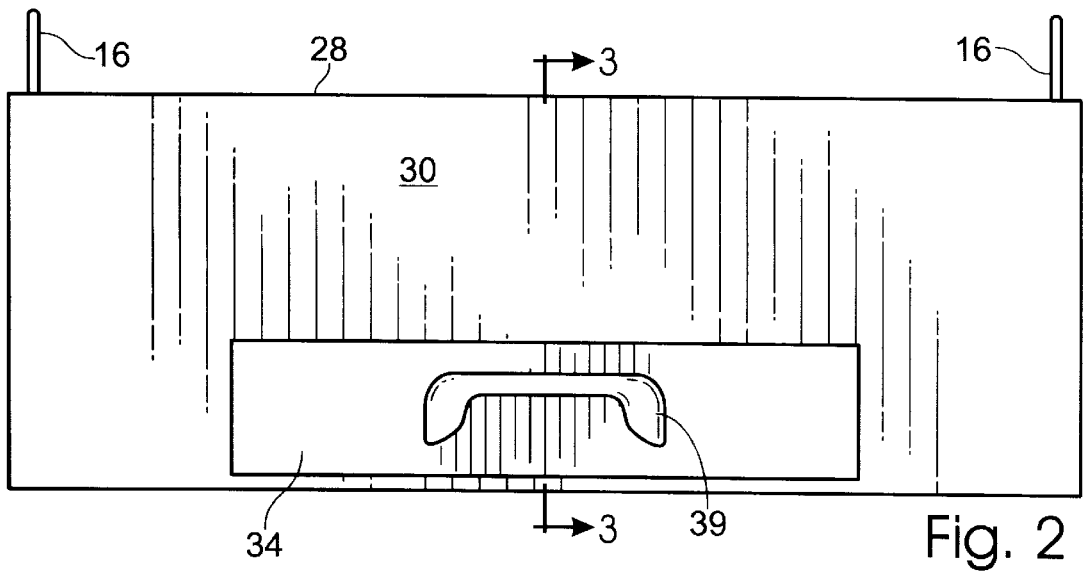
FIG. 2 is a front view of the litter box.
Figure 3:
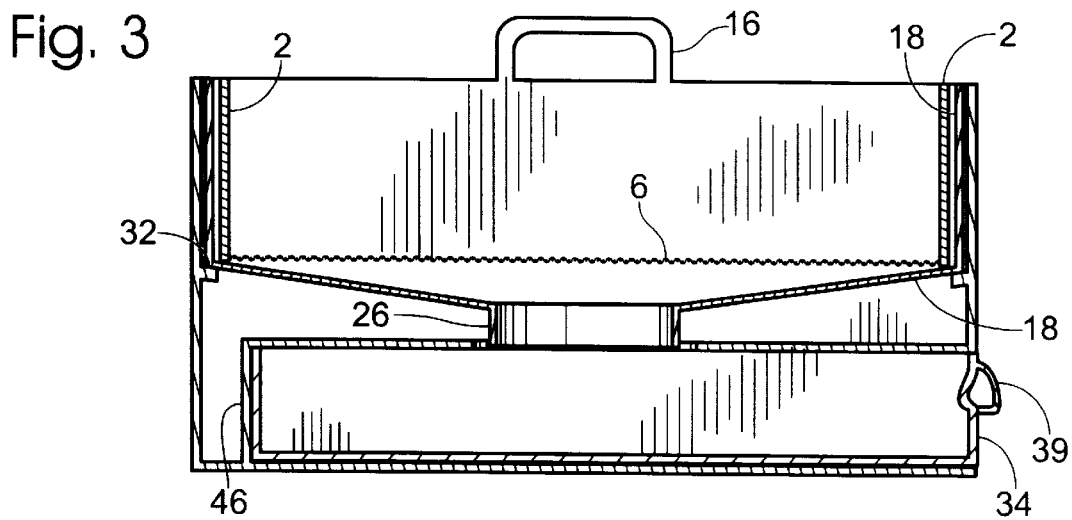
FIG. 3 is a cut away side view of the litter box of FIG. 1 taken along line 3—3 of FIG. 2.

FIGS. 1–3 show a preferred embodiment of the animal litter box. The litter box comprises a litter tray 2 with an upstanding perimeter wall 4 and liquid permeable bottom means 6 with enough rigidity to support the litter and an animal with minimal flexing. The preferred liquid permeable bottom means 6 includes a plurality of openings 8 sized to allow liquid, but not litter, to flow through the openings 8. In this embodiment, preferably the litter tray 2 is made of an integrally molded strong plastic material.

Figure 6:
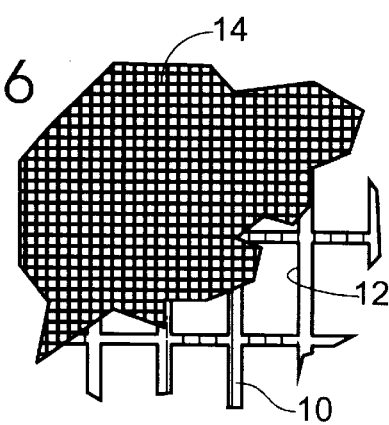
FIG. 6 shows an enlarged fragmentary view of an embodiment of the liquid permeable bottom means of the litter tray.

FIG. 6 shows another preferred embodiment of the litter tray 2 liquid permeable bottom means 6. Shown is a two-part construction for the litter tray 2 liquid permeable bottom means 6—a lower, rigid liquid permeable support portion 10 defining a plurality of openings 12 and an upper fine mesh screen 14 attached securely to the lower support portion 10. The openings 12 are large enough to allow the free flow of liquid, but are small enough to provide support and rigidity to an animal—preferably the openings 12 are a ½ inch by ½ inch. With this alternate preferred construction of the liquid permeable bottom means 6, the upstanding perimeter walls 4 and bottom support portion 10 would preferably be of an integrally molded plastic material, and the upper mesh portion 14 would be of a non-corrosive metal screening material, the upper mesh portion 14 attached securely at its outer edges to the bottom support portion 10. However, the bottom support portion 10 could be made of a vinyl coated steel wire or other enamels or coatings, or a plated metal and if so a non-corrosive plated metal, or simply a plastic material.

With either embodiment of the litter tray 2, it is preferable that the upstanding perimeter wall 4 includes a means for removal. Preferably, the means for removal would be integrally molded plastic material handles 16, one positioned on each end of the litter tray 2, though many types of handles would be appropriate, integral or attached.

A further litter tray variation 2 includes a tray with no upstanding perimeter wall 4. As such, the litter tray 2 may simply comprise a liquid permeable bottom means 6 in the form of a rigid sheet preferably as disclosed in either of the two embodiments above.

The litter box also comprises a drain pan 18 with an upstanding perimeter wall 20 and a floor 22 that slopes inwardly and downwardly from the perimeter wall 20. The floor 22 includes a drain pan hole 24, the drain pan hole 24 preferably including a downward flange 26 for liquid, and the drain pan hole 24 preferably positioned in the center of the floor at the lowest point created by the sloping floor 22. The drain pan 18 is preferably sized to receive and support the litter tray 2 within its perimeter wall 20 so as to create a snug fit with the litter tray 2 in any embodiment of the litter tray 2 so that the litter tray 2 is supported so that there is a gap between the liquid permeable bottom means 6 and the drain pan floor 22. If the litter tray 2 is simply in the form of a rigid sheet without its upstanding perimeter wall 4, then the upstanding perimeter wall 20 of the drain pan 18 acts as a wall to prevent litter from being pushed out by an animal using the litter box. Preferably the drain pan 18 is manufactured of an integrally molded plastic material.

The litter box also comprises a base 28, preferably made of an integrally molded plastic material, with an upstanding perimeter wall 30 which is also sized to snugly receive and support the drain pan 18 within its perimeter wall 30. An internal perimeter shoulder 32 may additionally support the drain pan 18. The base 28 further comprises a reservoir drawer 34, also preferably of a plastic material, for receiving the liquid waste, which is removably placed through an opening 36 in the base 28 perimeter wall 30. The reservoir drawer 34 is positioned so it as to receive the liquid waste as it flows through the drain pan hole 24. In this preferred embodiment shown in FIGS. 1–3, the reservoir drawer 34 is positioned within a housing 46, said housing including a top 48, back 50 and sides 52. The top 48 of the housing 46 includes a hole 54 for receiving snugly the drain hole flange 26 for minimal escape of odors from between the drain pan hole 24 and the reservoir drawer 34. The reservoir drawer 34 may include a lid 38 and a handle 39 as shown in FIG. 4, the lid including a hole 40 positioned so that the liquid can flow into the reservoir drawer 34 when in position.

Figure 5:
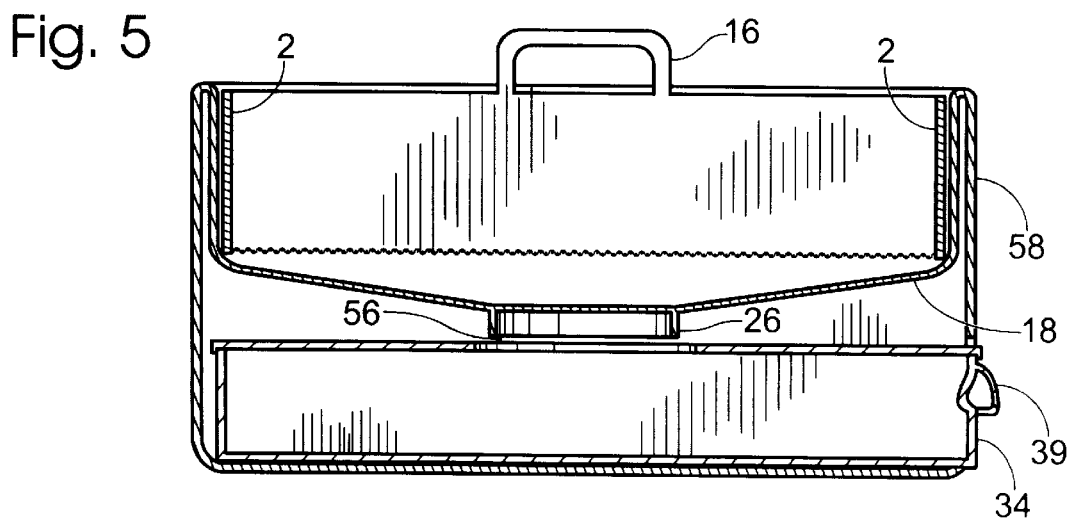
FIG. 5 is a cut away side view of the litter box of FIG. 4 taken along line 3—3 of FIG. 2.
Figure 4:
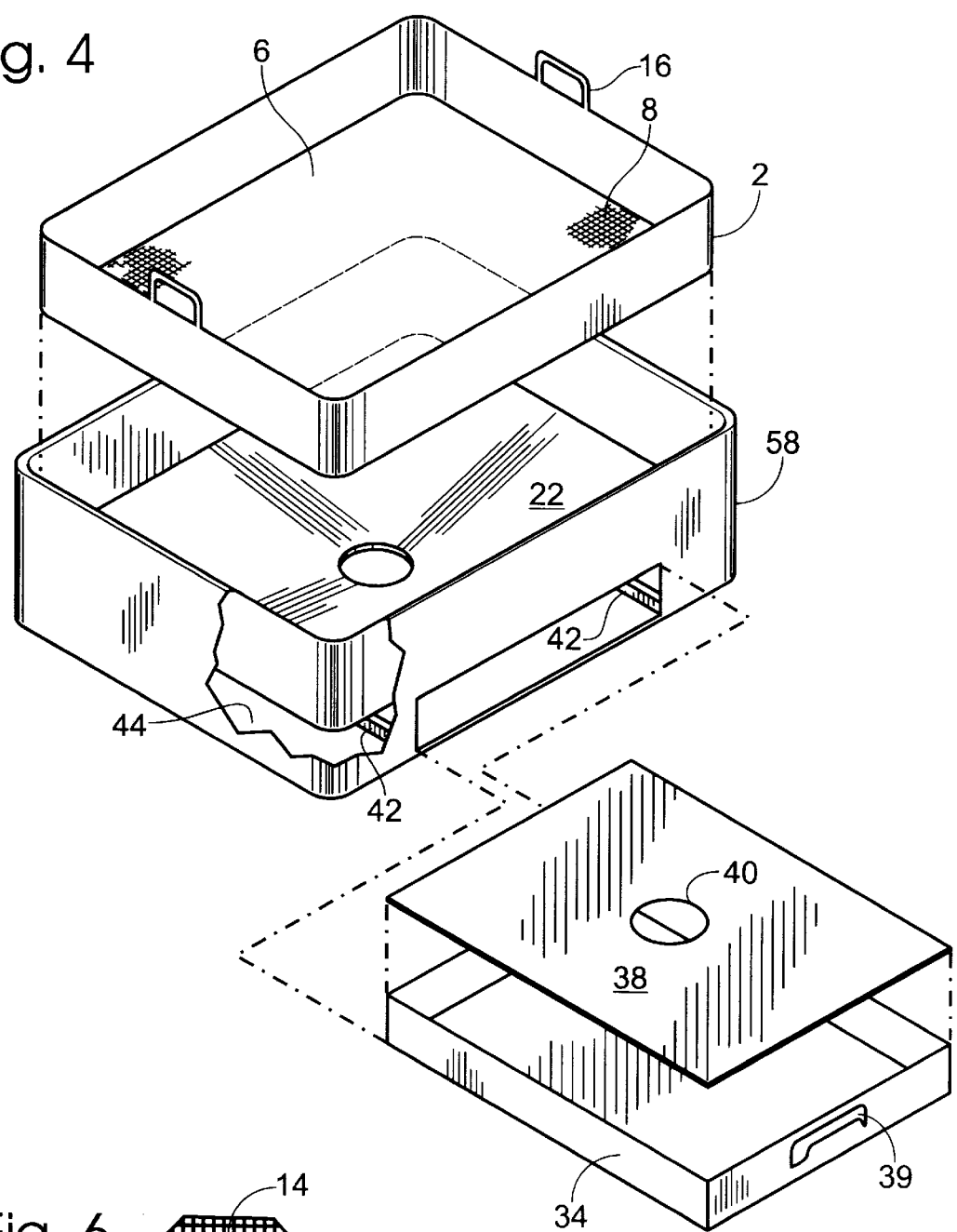
FIG. 4 is an exploded perspective view of the litter box showing an alternate preferred embodiment of the base.

FIGS. 4 and 5 show an alternative preferred embodiment of the base 28, the addition of a lid 38 for the reservoir drawer 34, and the addition of guides 42 for the reservoir drawer 34. The alternate base 58 is created by the combination of the base 28 and drain pan 18 shown in FIGS. 1–3, and these are preferably formed into one piece of integrally molded plastic material, rather than two pieces that fit together as shown earlier. With this embodiment of the base 58, the litter box would simply include the alternate base 58, a litter tray 2 and a reservoir drawer 34. This base 58 could receive either preferred embodiment of the litter tray. Either base 28 or base 58 when no housing 46 is included for the reservoir drawer 34, may further include guides 42 for the drawer, preferably the guides 42 are integrally molded in the bottom 44 of the base 28 or base 58, and a lid 38. When a lid 38 is included for the reservoir drawer 34, with or without a housing 46, the reservoir drawer 34 is sized and placed so that there is a gap 56 as shown in FIG. 5 between the flange 26 and the lid 38 for easy removal of the reservoir drawer 34.

In use, the litter used is preferably of a non-absorbent type litter material, and can include the commonly used clay particulate litter, or small gravel, epoxy coated plastic pellets, or paraffin pellets. The litter is spread on the litter tray 2 liquid permeable bottom means 6. To clean, the reservoir drawer 34 is simply removed and the liquid waste emptied by pouring, preferably by using the corner of the reservoir drawer 34 as a spout. A spout (not shown) may also be integrally molded with the reservoir drawer 34. To keep the odor at a minimal level, a disinfectant can be added to the reservoir drawer, and the litter can be sprayed with a non-toxic substance such as an enzyme deodorizer, such as Nature's Miracle®, or a vinegar and alcohol solution. To clean the litter a non-toxic detergent solution can be sprayed on the litter followed by a rinsing with clear water. When and if needed, the litter tray 2 can be removed by its handles 16 and taken outside and the litter cleaned and or hosed to freshen it, or it can be completely removed and refreshed. If the litter tray 2 is simply a flat sheet, then the drain pan 18 can be removed with the sheet included for ease in handling. The frequency of cleaning and need for removal will be much less frequent than the common litter box, and the task will be easier to perform with this litter box.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is, an animal litter box comprising:

1. A litter tray with liquid permeable bottom means for supporting and retaining a quantity of litter and an animal, A drain pan with an upstanding perimeter wall and a floor sloping inwardly and downwardly from said perimeter wall, said floor including a drain pan hole positioned at lowest point of said floor, said drain pan sized to support said litter tray snugly within said drain pan perimeter wall and positioned so that an air gap remains between said litter tray liquid permeable bottom means and said drain pan floor whereby liquid can pass through the liquid permeable bottom means of said litter tray and down said drain pan floor through the drain pan hole;

a reservoir drawer;

a base with an upstanding perimeter wall sized to receive said drain pan snugly within said base perimeter wall, said base including an opening in said base perimeter wall, said opening sized and positioned to receive said reservoir drawer for collection of liquid waste by, the reservoir drawer; said reservoir drawer removably placed within said base through said opening in said base perimeter wall and positioned so that liquid waste flowing through said drain pan hole is received by said reservoir drawer; and a housing for said drawer, said housing including a top with an opening positioned and sized to receive liquid waste.

2. An animal litter box as in claim 1 wherein said base and said drain pan are combined into a single unit, wherein said inwardly and downwardly sloping floor of said drain pan is integrally molded within said base rather than being supported by said base.

3. An animal litter box as in claim 1 wherein said liquid permeable bottom means defines a plurality of openings, said openings sized to permit the flow of liquid waste, but not the passage of litter.

4. An animal litter box as in claim 1 wherein said liquid permeable bottom means comprises a lower rigid liquid permeable support, said support including openings, said openings sized to support an animal, and an upper mesh screening for retention of litter, said upper mesh screening attached to perimeter edge of said lower rigid support.

5. An animal litter box as in claim 1 wherein said litter tray further includes an upstanding perimeter wall integral with said bottom means and a means for removal of said litter tray attached to either side of said perimeter wall for easy removal of said litter tray from said drain pan.

6. An animal litter box as in claim 1 wherein said litter tray, said drain pan, and said base are made of integrally molded plastic.

7. An animal litter box as in claim 1 wherein said base further includes integrally molded guides for said drawer, said guides positioned in said bottom of said base.

8. An animal litter box as in claim 1 wherein said drain pan hole includes an integrally molded downwardly positioned flange.

9. An animal litter box as in claim 1 wherein said reservoir drawer further includes a means for removal.

* * * * *